US009873292B2

(12) United States Patent
Sakiyama

(10) Patent No.: US 9,873,292 B2
(45) Date of Patent: Jan. 23, 2018

(54) AIRCRAFT TIRE

(71) Applicant: BRIDGESTONE CORPORATION, Chuo-ku, Tokyo (JP)

(72) Inventor: Tomotaka Sakiyama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 217 days.

(21) Appl. No.: 14/785,853

(22) PCT Filed: Apr. 14, 2014

(86) PCT No.: PCT/JP2014/060640
§ 371 (c)(1),
(2) Date: Oct. 21, 2015

(87) PCT Pub. No.: WO2014/175102
PCT Pub. Date: Oct. 30, 2014

(65) Prior Publication Data
US 2016/0075188 A1 Mar. 17, 2016

(30) Foreign Application Priority Data
Apr. 23, 2013 (JP) ................. 2013-090760

(51) Int. Cl.
*B60C 11/04* (2006.01)
*B60C 11/12* (2006.01)

(52) U.S. Cl.
CPC .......... *B60C 11/1236* (2013.01); *B60C 11/04* (2013.01); *B60C 11/042* (2013.01); *B60C 2011/129* (2013.01); *B60C 2011/1209* (2013.01); *B60C 2011/1295* (2013.01); *B60C 2200/02* (2013.01)

(58) Field of Classification Search
CPC .......... B60C 11/1236; B60C 2011/129; B60C 2011/1295; B60C 2200/02; B60C 11/04
See application file for complete search history.

(56) References Cited

U.S. PATENT DOCUMENTS

| 5,918,654 A | 7/1999 | Bossut |
| 2007/0137744 A1 | 6/2007 | Ueyoko et al. |
| 2012/0160383 A1* | 6/2012 | De Barsy ............ B60C 11/1218 |
| | | 152/209.18 |

FOREIGN PATENT DOCUMENTS

| DE | 102010016508 A1 | 10/2011 |
| EP | 0787601 A1 | 8/1997 |
| GB | 727207 * | 3/1955 |
| JP | S63-141806 A | 6/1988 |

(Continued)

OTHER PUBLICATIONS

English machine translation of JP11-059132, no date.*
Extended European Search Report dated Feb. 23, 2016, issued in corresponding EP Patent Application.

*Primary Examiner* — Robert C Dye
(74) *Attorney, Agent, or Firm* — Solaris Intellectual Property Group, PLLC

(57) ABSTRACT

An aircraft tire has: plural ribs, (a wide rib, narrow ribs) that are provided at a tread portion, and that are demarcated by circumferential direction grooves that extend in a tire circumferential direction; and sipes that are formed in a tire transverse direction in the respective ribs, and that have tire circumferential direction positions that differ in ribs that are adjacent to one another in the tire transverse direction.

1 Claim, 2 Drawing Sheets

(56) References Cited

FOREIGN PATENT DOCUMENTS

| | | | |
|---|---|---|---|
| JP | H09-207523 | A | 8/1997 |
| JP | H10-264609 | A | 10/1998 |
| JP | 11-059132 | * | 3/1999 |
| JP | 2007-168784 | A | 7/2007 |
| JP | 2009-61796 | A | 3/2009 |
| JP | 2012-180068 | A | 9/2012 |

* cited by examiner

AIRCRAFT TIRE

TECHNICAL FIELD

The present invention relates to an aircraft tire.

BACKGROUND ART

Japanese Patent Application Laid-Open (JP-A) No. 2007-168784 discloses an aircraft tire in which plural circumferential direction grooves, that extend in the tire circumferential direction, are formed.

SUMMARY OF INVENTION

Technical Problem

Because aircraft tires are used at a high internal pressure, the radial growth at the time of applying internal pressure is large, and the tread portion is stretched in the tire circumferential direction, and tension (stress, strain) arises. In this state, it is difficult to improve the resistance to cuts from the exterior, such as the insertion of a foreign object or the like.

Further, in a state in which tension has arisen, the wear-resistance performance of the tread portion deteriorates as compared with a state in which tension has not arisen. Moreover, due to the tread portion being stretched in the tire circumferential direction, the tread gauge that is the index of the wear resistance becomes thin.

In view of the above-described circumstances, an object of the present invention is to improve the cut-resistance performance and the wear-resistance performance of an aircraft tire.

Solution to Problem

An aircraft tire relating to a first aspect of the present invention comprises: a plurality of ribs that are provided at a tread portion, and that are demarcated by circumferential direction grooves that extend in a tire circumferential direction; and sipes that are formed in a tire transverse direction in the respective ribs, and that have tire circumferential direction positions that differ in ribs that are adjacent to one another in the tire transverse direction.

In this aircraft tire, due to vicinities of the sipes deforming easily at the time of application of internal pressure, the stress and strain that arise at the tread portion are reduced. The tire circumferential direction positions of theses sipes differ in ribs that are adjacent to one another in the tire transverse direction, and therefore, at the positions of the sipes, repeating of deformation at a wide range in the tire transverse direction is suppressed. Thus, even if the radial growth is large, the cut-resistance performance and wear-resistance performance can be improved.

In a second aspect of the present invention, in the aircraft tire relating to the first aspect, the ribs comprise a wide rib and a narrow rib having a smaller width than the wide rib, and an interval between the sipes in the tire circumferential direction is smaller in the wide rib than in the narrow rib.

In this aircraft tire, because the interval between the sipes in the tire circumferential direction is smaller in the wide rib than in the narrow rib, the difference in the rigidities of the wide rib and the narrow rib is decreased. Thus, regardless of the broadness/narrowness of the width of the rib, the stress and strain of the tread portion at the time of application of internal pressure can be reduced even more.

In a third aspect of the present invention, in the aircraft tire relating to the first aspect, among the ribs that are adjacent to one another in the tire transverse direction, the sipes of one of the ribs are formed at intermediate positions of a tire circumferential direction pitch of the sipes of the another of the ribs.

In this aircraft tire, at a rib and a rib that are adjacent to one another in the tire transverse direction, there is a state in which the tire circumferential direction positions of the sipes are furthest apart from one another. Therefore, the deformation of the tread portion at the time of traveling is made uniform, and the durability of the tire can be improved.

Advantageous Effects of Invention

As described above, the aircraft tire relating to the present invention has the excellent effect of being able to improve the cut-resistance performance and the wear-resistance performance of an aircraft tire.

DESCRIPTION OF EMBODIMENTS

Figure 1:
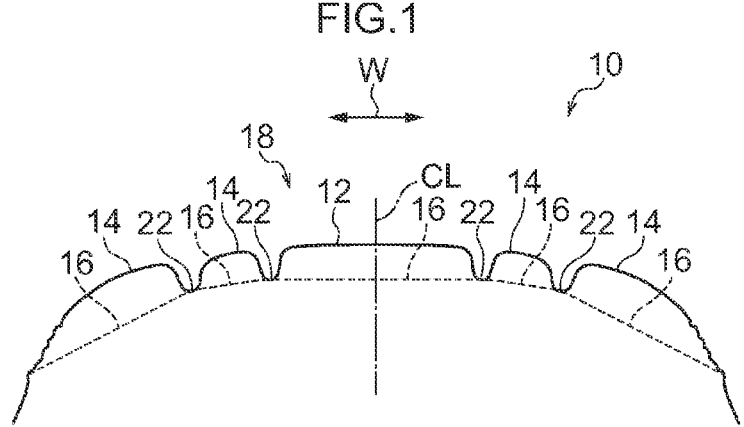
FIG. 1 is a cross-sectional view relating to a first embodiment, and showing a state in which a tread portion of an aircraft tire is cut in a tire transverse direction.

Forms for embodying the present invention are described hereinafter on the basis of the drawings. In the drawings, the arrow C direction indicates the tire circumferential direction, and the arrow W direction indicates the tire transverse direction. The tire transverse direction is the direction parallel to the tire rotational axis (not illustrated). The tire transverse direction can also be called the tire axial direction.

[First Embodiment]

Figure 2:
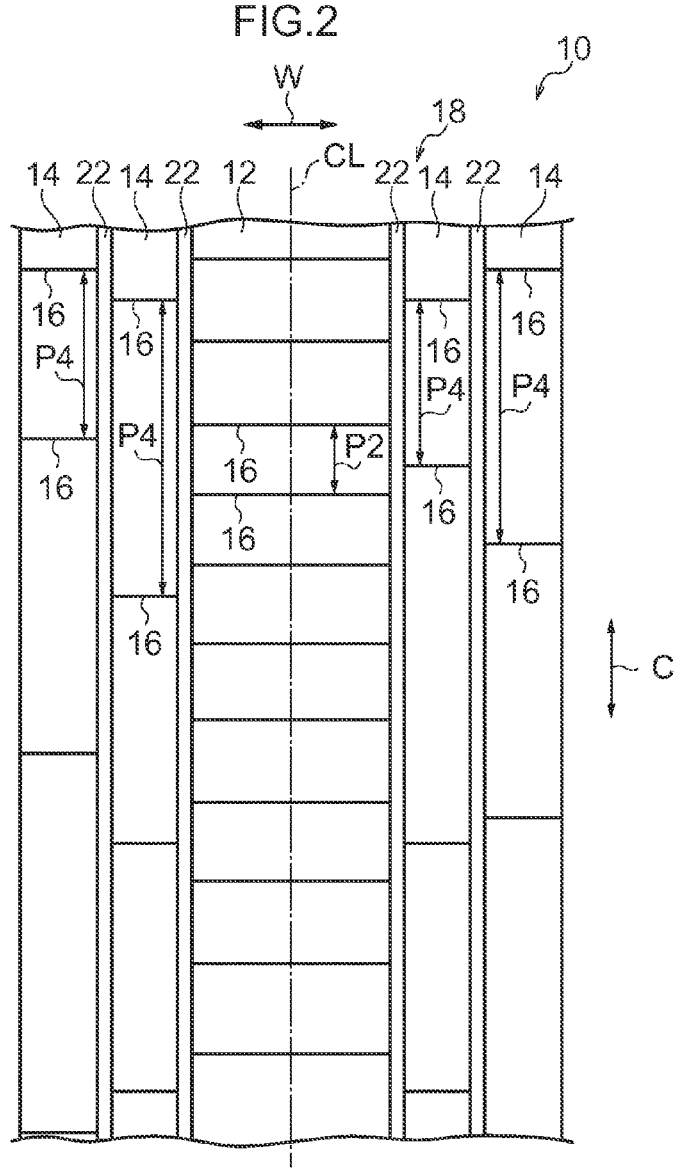
FIG. 2 is a development relating to the first embodiment, and showing an example of an arrangement of sipes at the tread portion.

In FIG. 1 and FIG. 2, an aircraft tire 10 relating to the present embodiment relates to, for example, a pneumatic radial tire for an aircraft, and has a wide rib 12 and narrow ribs 14 that are an example of plural ribs, and sipes 16.

The wide rib 12 and the narrow ribs 14 are provided in a tread portion 18, and are demarcated by, for example, four circumferential direction grooves 22 that extend in the tire circumferential direction. Two of the circumferential direction grooves 22 are formed at each of the both sides of a tire equatorial plane CL. The wide rib 12 and the narrow ribs 14 are land portions that extend in the tire circumferential direction without being demarcated by lateral grooves (not shown). The narrow ribs 14 have a smaller width than the wide rib 12. The wide rib 12 is positioned at the central portion of the tread portion 18 that includes the tire equatorial plane CL. The narrow ribs 14 are formed at two places at each of the tire transverse direction both sides of the wide rib 12. The widths of the four narrow ribs 14 may be the same or may be different.

The sipes 16 are formed in the tire transverse direction in the wide rib 12 and the narrow ribs 14, respectively, and the tire circumferential direction positions of the sipes 16 differ in ribs that are adjacent to one another in the tire transverse direction. Here, a sipe is a cut whose portion that opens to the tread surface closes at the time of contacting the ground. In the present embodiment, the tire circumferential direction positions of the respective sipes 16 differ in the wide rib 12 and the narrow ribs 14 that are adjacent to one another. Further, the tire circumferential direction positions of the respective sipes 16 differ also at the narrow ribs 14 that are adjacent to one another. In other words, the sipes 16 do not continue from rib to rib that are adjacent to one another, and are disconnected in vicinities of the circumferential direction grooves 22. As shown in FIG. 1, the depth of the sipes 16 is equivalent to the depth of the circumferential direction grooves 22, but is not limited to this and may be shallower than or deeper than the depth of the circumferential direction grooves 22.

As shown in FIG. 2, the interval between the sipes in the tire circumferential direction is smaller in the wide rib 12 than in the narrow ribs 14. This interval is the tire circumferential direction pitch of the sipes 16 at the tread surface of the tread portion 18. In measuring this interval, the center of the sipe 16 may be the reference, or, by considering portions of the respective ribs that are demarcated by the sipe 16 to be blocks, the wall portions of these blocks may be used as the reference. Given that the interval of the sipes 16 at the wide rib 12 is P2 and the interval of the sipes 16 at the narrow ribs 14 is P4, P2<P4. Due thereto, the surface areas of the blocks (the portions demarcated by the sipes 16) at the tread surface of the tread portion 18 can be made to be uniform, as compared with a case in which the interval of the sipes 16 in the tire circumferential direction is constant regardless of the broadness/narrowness of the width of the rib. It is desirable that the surface areas of the blocks are constant.

Note that the direction of the sipes 16 is not limited to being parallel to the tire transverse direction, and may be inclined with respect to the tire transverse direction. Further, the sipes 16 are not limited to rectilinear sipes, and various sipe shapes, such as zigzag sipes that have an amplitude in the tire circumferential direction, or the like can be applied. Moreover, the interval P2 of the wide rib 12 and the interval P4 of the narrow ribs 14 respectively are not limited to being constant, and may be varied appropriately in the tire circumferential direction.

Because the internal structure of the aircraft tire 10 can be made to be a structure that is similar to that of a conventional aircraft tire, description thereof is omitted.

(Operation)

The present embodiment is structured as described above, and the operation thereof is described hereinafter. In FIG. 1 and FIG. 2, at the aircraft tire 10 relating to the present embodiment, due to the vicinities of the sipes 16 deforming easily at the time of application of internal pressure, the stress and strain that arise at the tread portion 18 are reduced. Because the tire circumferential direction positions of the sipes 16 differ in ribs that are adjacent to one another in the tire transverse direction, at the positions of the sipes 16, repeating of deformation at a wide range in the tire transverse direction is suppressed. Therefore, even if the radial growth is large, the cut-resistance performance and wear-resistance performance can be improved. Because the interval of the sipes 16 between the sipes in the tire circumferential direction is smaller in the wide rib 12 than in the narrow ribs 14 (P2<P4), the difference in the rigidities of the wide rib 12 and the narrow ribs 14 is decreased. Thus, regardless of the broadness/narrowness of the width of the rib, the stress and strain of the tread portion 18 at the time of application of internal pressure can be reduced even more.

[Second Embodiment]

Figure 3:
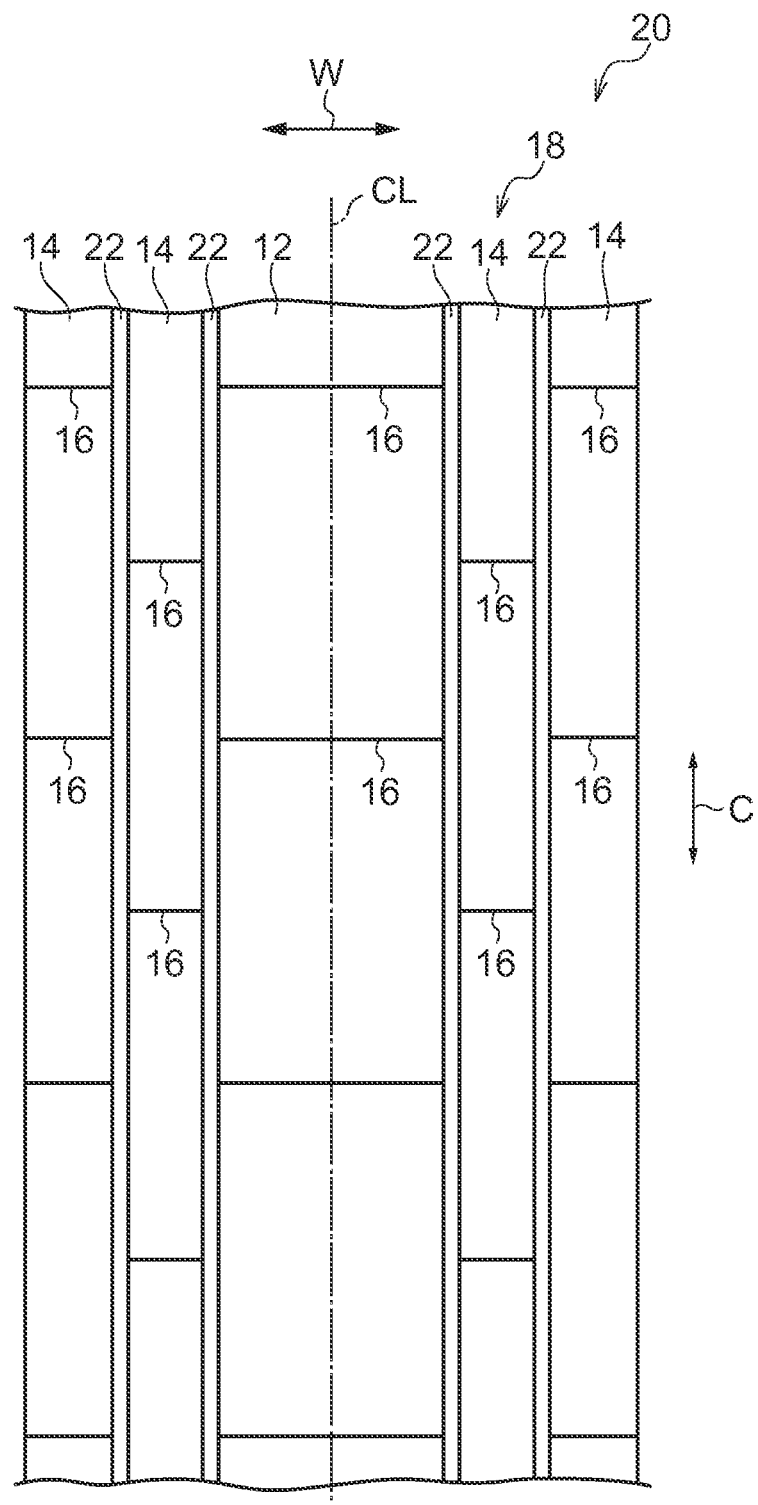
FIG. 3 is a development relating to a second embodiment, and showing an example of an arrangement of the sipes at the tread portion.

In FIG. 3, at an aircraft tire 20 relating to the present embodiment, the interval of the sipes 16 in the tire circumferential direction is constant regardless of the broadness/narrowness of the width of the rib. Further, among the ribs that are adjacent to one another in the tire transverse direction (e.g., the wide rib 12 and the narrow rib 14), the sipes 16 of one of the ribs (e.g., the wide rib 12) are formed at intermediate positions of the tire circumferential direction pitch of the sipes 16 of the another rib (e.g., the narrow rib 14). Also between two narrow ribs 14 that are adjacent to one another in the tire transverse direction, the sipes 16 of one are formed at intermediate positions of the tire circumferential direction pitch of the sipes 16 of the other. In other words, the tire circumferential direction positions of the sipes 16 coincides at ribs that are not adjacent to one another in the tire transverse direction.

Because other portions are similar to those of the first embodiment, the same portions are denoted by the same reference numerals in the drawings, and description thereof is omitted.

(Operation)

The present embodiment is structured as described above, and the operation thereof is described hereinafter. In FIG. 3, at the aircraft tire 20 relating to the present embodiment, at a rib and a rib that are adjacent to one another in the tire transverse direction, there is a state in which the tire circumferential direction positions of the sipes 16 are furthest apart from one another. Accordingly, at the time of traveling, at the positions of the sipes 16, repeating of deformation at a wide range in the tire transverse direction is suppressed. Therefore, the deformation of the tread portion 18 at the time of traveling is made uniform, and the durability of the tire can be improved.

[Other Embodiments]

Although in the above-described embodiments, the ribs have the wide rib 12 and the narrow ribs 14, the embodiments are not limited to this, and the widths of the ribs may be constant. Further, in the first embodiment, the interval between the sipes 16 in the tire circumferential direction is smaller in the wide rib 12 than in the narrow ribs 14 (P2<P4), but the embodiments are not limited to this, and the interval may be made to be equal (P2=P4), or the magnitudes of the intervals may be made to be opposite to that (P2>P4). Further, in the illustrated example, the sipes 16 traverse the respective ribs, but the embodiments are not limited to this, and both ends may be final ends within the respective ribs, or one ends may open at the circumferential direction grooves 22 and the other ends may be final ends within the ribs. Moreover, the sipes 16 are not limited to continuous sipes, and may be discontinuous sipes.

(Experimental Examples)

Tests relating to the wear-resistance performance and cut-resistance performance were carried out on aircraft tires relating to a Conventional Example and Examples 1 through 4. The tire size is APR1400X530R23. At all of the tires, four circumferential direction grooves are formed in the tread portion in the same way as in the example shown in FIG. 2. Sipes are not provided in the Conventional Example. In the Examples, the sipes are disposed uniformly in the tire circumferential direction. The respective testing conditions are as follows.

[Wear-Resistance Performance Test]

At the time of a prescribed internal pressure and a prescribed load, the tire was rotated at a speed of 2 m/min, and the shearing force and slip amount applied to the land portions at this time were measured. The integrated value of the shearing force and slip amount was made to be the wear energy, and this wear energy was evaluated as a measure of the wear-resistance performance.

[Cut-Resistance Performance Test]

At the time of a prescribed internal pressure and a prescribed load, the tire was rotated at a speed of 10 m/s, and, at that time, the tire was made to tread on a blade-like cutter of a width of 500 mm and a height of 30 mm. The depth of the cut formed in the tire was used as a measure of the cut-resistance performance.

The test results are as shown in Table 1, and the respective performances are expressed with the Conventional Example being an index of 100. A higher numerical value expresses a better result. In accordance with these tests, it could be confirmed that, accompanying an increase in the number of sipes, the wear-resistance performance and the cut-resistance performance of the tread portion improved.

TABLE 1

|  | Conventional Example | Example 1 | Example 2 | Example 3 | Example 4 |
|---|---|---|---|---|---|
| Number of sipes of wide rib | — | 8 | 12 | 18 | 24 |
| Wear-resistance performance | 100 | 105 | 107 | 108 | 108 |
| Cut-resistance performance | 100 | 110 | 112 | 114 | 115 |

The disclosure of Japanese Patent Application No. 2013-90760 filed on Apr. 23, 2013 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

EXPLANATION OF REFERENCE NUMERALS 10 aircraft tire
12 wide rib (rib)
14 narrow rib (rib)
16 sipe
18 tread portion
20 aircraft tire
22 circumferential direction groove

The invention claimed is:

1. An aircraft tire, comprising:
a plurality of ribs that are provided at a tread portion, and that are demarcated by circumferential direction grooves that extend in a tire circumferential direction; and
sipes that are formed in a tire transverse direction in the respective ribs, and that have tire circumferential direction positions that differ in ribs that are adjacent to one another in the tire transverse direction; wherein
the ribs comprise a wide rib and a narrow rib having a smaller width than the wide rib;
an interval between the sipes in the tire circumferential direction in the wide rib is equal to an interval between the sipes in the tire circumferential direction in the narrow rib;
among the ribs that are adjacent to one another in the tire transverse direction, the sipes of one of the ribs are formed at intermediate positions of a tire circumferential direction pitch of the sipes of another of the ribs; and
tire circumferential direction positions of the sipes of one rib are furthest apart from the tire circumferential direction positions of the sipes of the adjacent rib.

* * * * *